United States Patent [19]

Castro et al.

[11] Patent Number: 4,771,450
[45] Date of Patent: Sep. 13, 1988

[54] METHOD AND APPARATUS FOR CONVERTING ROTARY SIGNALS TO AUDIOFREQUENCY SIGNALS

[76] Inventors: Horacio Castro; Marcelo Castro, both of El Salvador 5962, Buenos Aires (1414), Argentina

[21] Appl. No.: 833,275

[22] Filed: Feb. 27, 1986

Related U.S. Application Data

[63] Continuation-in-part of Ser. No. 479,026, Mar. 25, 1983, Pat. No. 4,618,742.

[30] Foreign Application Priority Data

Mar. 31, 1982 [AR] Argentina .............................. 288969
Dec. 13, 1985 [AR] Argentina .............................. 302581
Feb. 12, 1986 [AR] Argentina .............................. 303116

[51] Int. Cl.⁴ ...................... H04M 11/00; H04M 1/26
[52] U.S. Cl. .................................. 379/102; 379/386; 379/353
[58] Field of Search ............... 379/386, 102, 103, 104, 379/105, 286, 281, 280, 284, 353, 351

[56] References Cited

U.S. PATENT DOCUMENTS 3,851,110 11/1974 Kelly et al. .......................... 379/286
3,935,392 1/1976 Smith et al. .......................... 379/386
4,006,316 2/1977 Bolgiano .............................. 379/104
4,066,846 1/1978 Champan et al. ............... 379/386 X

*Primary Examiner*—James L. Dwyer
*Attorney, Agent, or Firm*—Fleit, Jacobson, Cohn & Price

[57] ABSTRACT

A method and apparatus for converting into other signals the audiofrequency signals produced through rotary dialing by a calling party during a phone communication established with the apparatus of the invention, the latter being connected to the called party's phone line.

The audiofrequency signals produced through rotary dialing are converted either into multifrequencies, such as D.T.M.F. or Touch-Tone, or into other audiofrequencies or other signals.

Signals thus converted, and which can be introduced or injected into the called party's phone line, allow a calling party to remotely control from a rotary phone various types of equipment or systems.

Further, signals thus converted allow a calling party to command from a rotary phone any equipment existing in the market or to be designed in the future capable of being controlled by means of D.T.M.F. signals such as "Touch-Tone" signals.

16 Claims, 3 Drawing Sheets

METHOD AND APPARATUS FOR CONVERTING ROTARY SIGNALS TO AUDIOFREQUENCY SIGNALS

This is a continuation-in-part of U.S. patent application Ser. No. 479,026 filed Mar. 25, 1983, now U.S. Pat. No. 4,618,742.

FIELD OF THE INVENTION

The present invention belongs to the telephone communications art and it is particularly based on the utilization of the audiofrequency information produced through rotary dialing from a calling phone after a phone communication has been established with the apparatus of the invention. The control of equipment or systems through phone lines is also comprised within the scope of the invention.

DESCRIPTION OF THE PRIOR ART

The technology applied to the conversion of analog signals into digital information is well known.

The present disclosure applies the universally known SCHMITT TRIGGER together with a microprocessor, the latter being substantially used as a time analyzer and information generator.

The following U.S. Patents make up the background of the present disclosure: U.S. Pat. Nos. 4,121,053—Dick; 4,006,316—Bolgiano; 3,784,721—Kilby; 3,793,487—Kilby; 3,702,904—Bard; 3,868,640—Binnie et al; 3,641,971—Walberg; 3,647,971—Cushman et al; 4,095,050—Beachem et al; 4,387,272—Castro et al; 4,549,045—Castro et al.

Further, the background includes U.S. patent application Ser. No. 06/479 026—Castro et al (priority as from Mar. 31, 1982) and U.S. Pat. No. 4,446,339—Bolgiano (priority as from Apr. 26, 1982). The method and apparatus of the present invention can be used together with the apparatuses disclosed in the U.S. Patent Application filed on Sept. 11, 1985 (priority as from September, 1984), Castro et al, about the enabling and/or inhibition of signal decoding modules.

SUMMARY OF THE INVENTION

The method and apparatus of the present invention allow the conversion into other signals of the audiofrequency signals produced by a calling party either through rotary dialing from a conventional rotary phone or an automatic phone dialer or through rotary phone impulsion by electronic means during a phone communication established with the apparatus of the invention.

The practical configurations described in the present disclosure relate to phone systems wherein the opening time of the phone pulse generating contact (or equivalent function in the case of impulsion by electronic means) is 66.6 milliseconds; the closure time being 33.3 milliseconds approximately. Said practical configurations also relate to phone systems featuring 60 and 40 milliseconds as opening and closure times respectively, and, further, those featuring 50 and 50 milliseconds respectively.

The rotary dial phone impulsion rate used throughout the specification is 10 pulses per second approximately, i.e., that impulsion rate wherein the dialing of an "O" generates ten pulses during a time period of approximately 1 second.

The practical configurations of the apparatus disclosed in the present invention and the methodology being used therein can fit higher phone impulsion rates by means of a proportional reduction of the time periods set forth in the present disclosure.

The apparatus of the invention is connected to the called party's phone line. The audiofrequency signals produced through rotary dialing are converted either into multifrequencies, such as DTMF or Touch-Tone, or into other audiofrequencies, or other signals. The signals thus converted and which can be injected into the called party's phone line allow the calling party to remotely control from a calling rotary phone various types of equipment or systems. In this invention, the different embodiments contemplate the possibility of injecting said other signals into the called party's phone line; obviously, the method and apparatus used for decoding audiofrequencies do not necessarily require said other signals to be injected into the called party's phone line, depending on the use to be given to said decoded information.

Said equipment or systems (which are not the object of the present disclosure) can be, e.g., calling and called party identifiers; phone call branching devices; private exchanges allowing access to phone extensions without operator intervention; computers; Dictaphones; printers; facsimile equipment; intercommunicators; dedicated line equipment; microphones; speakers; conventional phone answering machines; recorders; message recorder-players; voice mail and voice messaging; alarm systems; locks; lights; air conditioners; furnaces; sprinklers; and any type of equipment or system capable of being coupled to a phone line as well as those to be remotely turned on/off.

A first variant of the method for converting into other signals the audiofrequency produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a certain first time period initiated as from the ending of the presence of said first square wave signal;

(h) determining the presence of the second square wave signal produced by the ending of said phone pulse within a certain second time period initiated immediately after said first time period has elapsed;

(i) accumulating the logic data corresponding to the determination of said first and second square wave signals produced by said phone pulse;

(j) ignoring the presence of square wave signals during a certain third time period initiated as from the ending of the presence of said second square wave signal;

(k) determining, should the beginning of an additional phone pulse take place, the presence of a first additional square wave signal within a certain fourth time period initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a certain other time period initiated immediately after said fourth time period, within which the presence of an additional square wave signal is not determined, has elapsed;

(u) recycling back to step (d);

(v) opening said d.c. current or conversation circuit on said called party's phone line after a certain time period has elapsed initiated after performance of step (c), or when the calling party abandons said conversation circuit;

(w) recycling back to step (a).

A second variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line of audiofrequency signals sent through rotary dialing from said phone set by the calling party;

(e) converting into square wave signals said audiofrequency signals received on said called party's phone line;

(f) determining the presence of a square wave signal;

(g) determining the absence of a pulse of a phone pulse train when the presence of said square wave signal is over before a certain minimum time period has elapsed initiated immediately after the presence of said square wave signal has been determined;

(h) recycling back to step (d).

A third variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) determining the absence of a pulse of a phone pulse train when the presence of said square wave signal is not over before a certain maximum time period has elapsed initiated immediately after the presence of said square wave signal has been determined;

(h) recycling back to step (d).

A fourth variant of the method for converting into other signals the audiofrequency signals produced through rotary dialing from a calling phone set in accordance with its impulsion rate, and sent by the calling party to the called party's phone line comprises the following steps:

(a) sending from the calling party's end the series of characters corresponding to the caled party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 30 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signal produced by said additional phone pulse.

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a time period of approximately 260 milliseconds initiated immediately after said fourth time period within which the presence of an additional square wave signal is not determined has elapsed;

(u) recycling back to step (d);

(v) opening said d.c. current or conversation circuit on said called party's phone line after a certain time period has elapsed, initiated after performance of step (c) or when the calling party abandons said conversation circuit;

(w) recycling back to step (a).

A fifth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 46 milliseconds initiated as from the ending of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 27 milliseconds initiated as from the determination of the prsence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signal produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the end of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a time period of approximately 360 milliseconds initiated immediately after said fourth time period within which the presence of an additional square wave signal is not determined has elapsed;

(u) recycling back to step (d);

(v) opening said d.c. current or conversation circuit on said called party's phone line after a certain time period has elapsed initiated after performance of step (c) or when the calling party abandons said conversation circuit;

(w) recycling back to step (a).

A sixth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 51 milliseconds initiated as from the determination of the presence of said first square wave signal;

(h) determining the presence of the second square wave signal produced by the ending of said phone pulse within a second time period of approximately 48 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 27 milliseconds initiated as from the determination of the presence of said second square wave signal;

(k) determining, should the beginning of an additional phone pulse take place, the presence of a first additional square wave signal within a fourth time period of approximately 99 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a time period of approximately 309 milliseconds initiated immediately after said fourth time period within which the presence of an additional square wave signal is not determined has elapsed;

(u) recycling back to step (d);

(v) continuing to receive said audiofrequency signals on said called party's phone line, converting them into said other signals, even though the coupling of other equipment on said phone line has taken place;

(w) recycling back to step (a) when said d.c. current circuit is opened on said called party's phone line.

A seventh variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) determining the absence of a pulse of a phone pulse train when the presence of said square wave signal is over before a minimum time period of approximately 2 milliseconds has elapsed, initiated immediately after the presence of said square wave signal has been determined;

(h) recycling back to step (d).

An eighth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) determining the absence of a pulse of a phone pulse train when the presence of said square wave signal is not over before a maximum time period of approximately 4 milliseconds has elapsed, initiated immediately after the presence of said square wave signal has been determined;

(h) recycling back to step (a).

A ninth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) determining the absence of a pulse of a phone pulse train when the presence of said square wave signal is over before a minimum time period of approximately 4 milliseconds has elapsed, initiated immediately after the presence of said square wave signal has been determined;

(h) recycling back to step (d).

A tenth variant of the method for converting into other signals the audiofrequency signals produced through rotary dialing from a calling phone set in accordance with its impulsion rate, and sent by the calling party to the called party's phone line comprises, the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) determining the absence of a phone pulse of a phone pulse train when the presence of said square wave signal is not over before a maximum time period of approximately 7 milliseconds has elapsed, initiated immediately after the presence of said square wave signal has been determined;

(h) recycling back to step (d).

An eleventh variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 30 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wavel signals produced by said possible additional phone pulses;

(p) determining the ending of said phone pulse train when the presence of a second additional square wave signal is not determined within a second time period following a fourth time period during which the presence of an additional square wave signal has been determined;

(q) converting said logic data accumulated up to step (o) into information identifying said phone pulse train;

(r) converting said information into other signals;

(s) injecting said other signals into said phone line;

(t) ignoring the presence of square wave signals during a time period of approximately 330 milliseconds initiated immediately after said second time period within which the presence of a second additional square wave signal is not determined has elapsed;

(u) recycling back to step (d);

(v) opening said d.c. current or conversation circuit on said called party's phone line after a certain time period has elapsed, initiated after performance of step (c) or when the calling party abandons said conversation circuit;

(w) recycling back to step (a).

A twelfth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of a square wave signal;

(g) ignoring the presence of square wave signals during a first time period of approximately 50 milliseconds initiated as from the determination of the presence of said square wave signal;

(h) determining the absence of a first pulse of a phone pulse train when the presence of a square wave signal is not determined within a second time period of approximately 30 milliseconds initiated immediately after said first time period has elapsed;

(i) recycling back to step (d).

A thirteenth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) opening said d.c. current or conversation circuit on said called party's phone line should said audiofrequency signals not be received on said phone line within a certain time period initiated after performance of step (c);

(f) recycling back to step (a).

A fourteenth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of the phone pulse produced through rotary dialing of character "1" from said phone set;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse produced through rotary dialing of character "1" from said phone set;

(j) ignoring the presence of square wave signals during a third time period of approximately 30 milliseconds initiated as from the determination of the presence of said second square wave signal;

(k) determining the ending of the phone pulse train corresponding to said character "1" when the presence of a square wave signal is not determined within a fourth time period of approximately 50 milliseconds, initiated immediately after said third time period has elapsed;

(l) ignoring the presence of square wave signals during a time period of approximately 360 milliseconds initiated immediately after said fourth time period within which the presence of a square wave signal is not determined has elapsed;

(m) recycling back to step (d);

(n) determining the presence and accumulating the corresponding logic data of possible additional square wave signals produced by possible additional phone pulses produced through rotary dialing of more characters "1", as in steps (f) to (m);

(o) determining the absence of reception of audiofrequency signals produced through rotary dialing of more characters "1" when the presence of another first square wave signal and of another second square wave signal is not determined within a time period of approximately 1,000 milliseconds initiated as from recycling back to a step (d);

(p) converting said accumulated logic data into information resulting from the addition of characters "1" received as audiofrequency signals produced through rotary dialing;

(q) converting said information into other signals identifying the character resulting from said addition;

(r) injecting said other signals into said phone line;

(s) recycling back to step (d);

(t) opening said d.c. current or conversation circuit on said called party's phone line after a certain time period has elapsed initiated after performance of step (c) or when the calling party abandons said conversation circuit;

(u) recycling back to step (a).

A fifteenth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 27 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said infomation into other signals;

(s) injecting said other signals into said phone line;

(t) ignoring the presence of square wave signals during a time period of approximately 360 milliseconds initiated immediately after said fourth time period within which the presence of an additional square wave signal is not determined has elapsed;

(u) recycling back to step (d);

(v) continuing to receive audiofrequency signals on said called party's phone line, converting them into square wave signals when the coupling of another equipment on said phone line takes place;

(w) stopping the conversion into other signals of said square wave signals produced by the audiofrequency signals produced through rotary dialing from said phone set;

(x) determining the presence of square wave signals produced by the audiofrequency signals produced through rotary dialing from said phone set of a certain single character;

(y) initiating again the conversion into other signals of said square wave signals produced by the audiofrequency signals produced through rotary dialing of any character from said phone set;

(z) recycling back to step (a) when said d.c. current circuit is opened on said called party's phone line.

A sixteenth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) determining the presence of the second square wave signal produced by the ending of said phone pulse within a first time period of approximately 100 milliseconds initiated as from the determination of the presence of said first square wave signal;

(h) accumulating the logic data corresponding to the determination of said first and second square wave signals produced by said phone pulse;

(i) ignoring the presence of square wave signals during a second time period of approximately 27 milliseconds initiated as from the determination of the presence of said second square wave signal;

(j) determining, should the beginning of an additional phone pulse take place, the presence of a first additional square wave signal within a third time period of approximately 100 milliseconds initiated immediately after said second time period has elapsed;

(k) determining the presence of the second additional square wave signal produced by the ending of said additional phone pulse, as in step (g);

(l) accumulating the logic data corresponding to the determination of said first and second additional square wave signals produced by said possible additional phone pulse;

(m) determining the presence of possible additional square wave signals produced by possible additional phone pulse;

(n) accumulating the logic data corresponding to the determination of said possible additional square wave signals produced by said possible additional phone pulses;

(o) determining the ending of said phone pulse train when the presence of an additional square wave signal is not determined within a third time period;

(p) converting said accumulated logic data into information identifying said phone pulse train;

(q) converting said information into other signals;

(r) injecting said other signals into said phone line;

(s) ignoring the presence of square wave signals during a time period of approximately 310 milliseconds initiated immediately after said third time period within which the presence of an additional square wave signal is not determined has elapsed;

(t) recycling back to step (d);

(u) opening the d.c. current of conversation circuit on said called party's phone line after a certain time period has elapsed, initiated after performance of step (c) or when the calling party abandons said conversation circuit;

(v) recycling back to step (a).

A seventeenth variant of the method for converting into other signals the audiofrequency signals produced through rotary dialing from a calling phone set in accordance with its impulsion rate, and sent by the calling party to the called party's phone line, comprises the following steps:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the square wave signal produced by the beginning of a first pulse of a phone pulse train;

(g) ignoring the presence of square wave signals during a first time period of approximately 85 milliseconds initiated as from the determination of the presence of said square wave signal;

(h) accumulating the logic data corresponding to the determination of said square wave signal produced by said phone pulse;

(i) determining, should the beginning of an additional phone pulse take place, the presence of an additional square wave signal within a second time period of approximately 70 milliseconds initiated immediately after said first time period has elapsed;

(j) accumulating the logic data corresponding to the determination of said additional square wave signal produced by said additional phone pulse;

(k) determining the presence of possible additional square wave signals produced by possible additional phone pulses, as in steps (g) and (i);

(l) accumulating the logic data corresponding to the determination of said possible additional square wave signals produced by said possible additional phone pulses;

(m) determining the ending of said phone pulse train when the presence of an additional square wave signal is not determined within a second time period;

(n) converting said accumulated logic data into information identifying said phone pulse train;

(o) converting said information into other signals;

(p) injecting said other signals into said phone line;

(q) ignoring the presence of square wave signals during a time period of approximately 340 milliseconds initiated immediately after said second time period within which the presence of an additional square wave signal is not determined has elapsed;

(r) recycling back to step (d);

(s) opening said d.c. current or conversation circuit on said called party's phone line after a certain time period has elapsed, initiated after performance of step (c) or when the calling party abandons said conversation circuit;

(t) recycling back to step (a).

A first configuration of the apparatus for putting into practice the above described method together with its variants comprises a pair of terminals capable of being connected to said called party's phone line; the first terminal of said pair of terminals being connected through a first capacitor to the input of a phone call pulse train detector and, through a second capacitor, to one end of the primary winding of a first coupling transformer, to one end of a load impedance, to one input of an additional load detector and to one input of a called line d.c. current circuit opening detector; the second terminal of said pair of terminals being connected through the winding of a first relay to the other end of the primary winding of said first coupling transformer, to another input of said phone call pulse train detector, to another input of said additional load detector, to another input of said called line d.c. current circuit opening detector and to a contact of a second relay; the other end of said load impedance being connected to another contact of said second relay; the secondary of said first coupling transformer being connected to the input of a first amplifier having its output connected to the input of a tone detector and to a bandpass filter; the output of said phone call pulse train detector being connected to a first input of a microprocessor; the outputs of said additional load detector and of said tone detector being connected through one diode each to a second input of said microprocessor; the output of said bandpass filter being connected to a cascade made up by a pair of bandpass filters having its output connected to the input of a second amplifier having its output connected to a third amplifier; said third amplifier having its input bridged by a diode and its output connected to the input of an inverter SCHMITT-TRIGGER gate, the output of the latter being connected to a third input of said microprocessor; the output of said called line d.c. current circuit opening detector and a contact of said first relay being connected through one diode each to a fourth input of said microprocessor; a first output of said microprocessor being connected to the base of a transistor having its emitter ground-connected and the collector, through the winding of said second relay, to the power supply; a certain number of outputs of said microprocessor being connected to the inputs of an encoder having its output connected to the input of a fourth amplifier having its output connected to the primary of a second coupling transformer having its secondary connected to said pair of terminals through one capacitor each; finally, the other contact of said first relay connected to said power supply.

A second variant of the apparatus for putting into practice the above described method together with its variants comprises a pair of terminals capable of being connected to said called phone line; the first terminal of said pair of terminals being connected through a first capacitor to one input of a phone call pulse train detector and, through a second capacitor, to one end of the primary winding of a first coupling transformer, to one end of a load impedance, to one input of an additional load detector and to one input of a called line d.c. current circuit opening detector; the second terminal of said pair of terminals being connected through the winding of a first relay to the other end of the primary winding of said first coupling transformer, to another input of said phone call pulse train detector, to another input of said additional load detector and to another input of said called line d.c. current circuit opening detector and to a contact of a second relay; the other end of said load impedance being connected to another contact of said second relay; the secondary of said first coupling transformer being connected to the input of a first amplifier having its output connected to the input of a tone detector and to a bandpass filter; the output of said phone call pulse train detector being connected to a first input of a microprocessor; the outputs of said additional load detector and of said tone detector being connected through one diode each to a second input of said microprocessor; the output of said bandpass filter being connected to a cascade made up by a pair of bandpass filters having its output connected to the input of a second amplifier having its output connected to a third amplifier; said third amplifier having its input bridged by a diode and its output connected to the input of an inverter SCHMITT-TRIGGER gate, the output of the latter being connected to a third input of said microprocessor; the output of said called line d.c. current circuit opening detector and a contact of said first relay being connected through one diode each to a fourth input of said microprocessor; a first output of said microprocessor being connected to the base of a transistor having its emitter ground-connected and the collector, through the winding of said second relay, to the power supply, a second output connected to the base of another transistor having its emitter ground-connected and the collector, through the winding of a third relay, connected to said power supply, a third output being connected to the input of a voice synthesizer, a fourth output connected to the input of an audible signal generator, and a certain number of outputs connected to the inputs of an encoder; the outputs of said encoder, of said voice synthesizer, and of aid audible signal generator, being connected to the input of a fifth operational amplifier having its output connected to the input of said fourth amplifier; a contact of said relay connected to the output of said second amplifier and another contact connected through a resistor to the input of said second amplifier; the output of said fourth amplifier being connected to the primary of a second coupling transformer having its secondary connected to said pair of terminals through respective capacitors; the other contact of said first relay being connected to said power supply.

A third variant of the apparatus for putting into practice the above described method together with its variants comprises a pair of terminals capable of being connected to the called phone line; the first terminal of said pair of terminals being connected through a first capacitor to one input of a phone call pulse train detector and, through a second capacitor, to one end of the primary winding of a first coupling transformer and to one end of a load impedance; the second terminal of said pair of terminals being connected to the other end of the primary winding of said first coupling transformer, to another input of said phone call pulse train detector and to a contact of a first relay; the other end of said load impedance being connected to another contact of said first relay; the secondary of said first coupling transformer being connected to the input of a first operational amplifier which has a differential mode configuration, said first operational amplifier having its output connected to a second amplifier which has gain adjusting means, the output of said second amplifier being connected to the input of a lowpass filter having its output connected to the input of a cascade made up by bandpass-type filters; the output of said bandpass-type filters cascade being connected to the input of another cascade made up by lowpass filters having its output connected to a third amplifier which has gain adjusting means, said third amplifier in turn having its output connected to the input of a SCHMITT-TRIGGER; the output of said phone call pulse train detector and the output of said SCHMITT-TRIGGER being respectively connected to a first and a second inputs of a microprocessor; a first and a second outputs of said microprocessor being respectively connected to the base of a first and a second transistors; said first transistor with its emitter ground connected and its collector, through the winding of said first relay, connected to a power supply; said second transistor with its emitter ground-connected and its collector, through the winding of a second relay, connected to said power supply; a third output of said microprocessor connected to the input of an audible signal generator having its output connected to the input of a fourth amplifier having gain adjusting means; the output of said fourth amplifier connected to the end of a first winding of a second coupling transformer, the other end of said first winding being ground-connected; the ends of a second winding of said second coupling transformer, through one capacitor each, connected to said pair of terminals; said second relay with a pair of contacts for connection-disconnection of the gain adjusting means of said second amplifier; finally, said microprocessor with a certain number of outputs capable of being connected to the same number of inputs of an encoder.

DETAILED DESCRIPTION OF THE DRAWINGS

Figure 1:
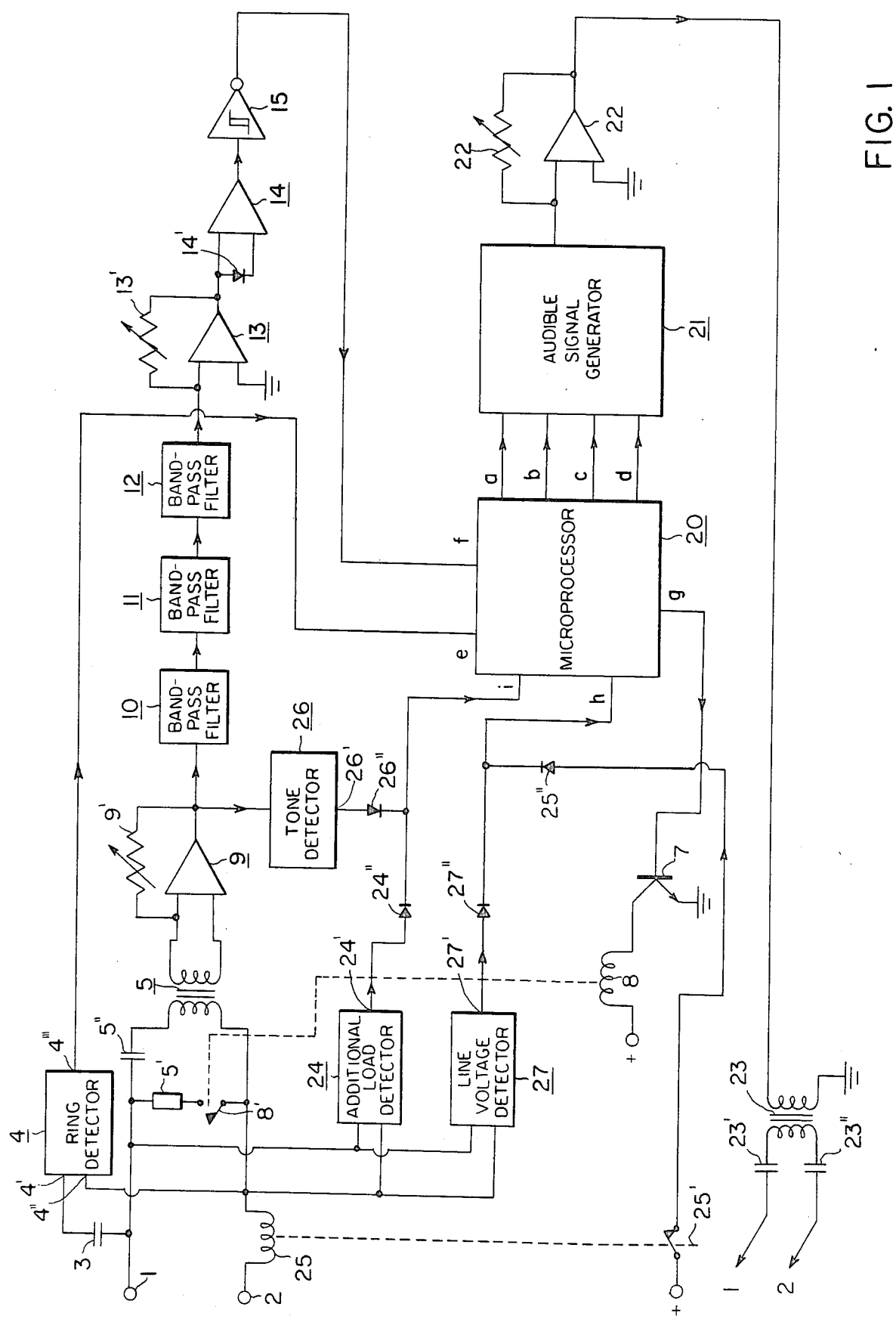
FIG. 1 represents a basic circuit configuration for putting into practice the method of the invention.

It can be seen in FIG. 1 that the apparatus of the invention comprises a pair of terminals 1 and 2 being connected to the phone line.

The signals or phone call pulse trains coming from the exchange enter signal or phone call pulse train detector 4 through inputs 4', after passing through capacitor 3, and 4". Said detector 4 produces a pulse through its output 4'" per each signal or phone call pulse train. Said pulse enters input "e" of microprocessor 20 (in this context, the word microprocessor means the electronic component proper plus the peripheral circuits and associated memories). Microprocessor 20 generates, through its output "g" a high logic level which, when inverted by transistor 7, produces the activation of relay 8. The latter, by means of its normally open contact 8', connects load impedance 5' to said phone line. Said load impedance 5' produces a d.c. current circulation on said phone line equal or approximate to the d.c. current circulation produced by a conventional phone having its receiver unhooked; therefore, the connection of said impedance 5' to said phone line produces the closure of the d.c. current circuit of the latter. As a result of this, the conversation circuit is established between the calling phone set and the apparatus of the invention, the latter being left enabled to decode the phone pulse trains sent through rotary dialing from the calling end and entering through terminals 1 and 2 as audiofrequency signals. Said audiofrequency signals enter through coupling transformer 5 to operational amplifier 9, the latter having a differential mode configuration. Said coupling transformer 5 is related to the phone line through capacitor 5". Said operational amplifier 9 gain can also be regulated by means of variable resistor 9' in order to maintain at a predetermined level said audiofrequency signals before they enter bandpass-type filter 10. The latter is intended for attenuating the most significant portion of said audiofrequency signals in the high frequency spectrum.

Filtered signals enter a cascade made up by two bandpass-type filters 11 and 12, intended for recovering the most useful components of said signals, thus attenuating the less useful ones as well as the noise components accompanying the phone pulses in their run through the phone lines.

The signals resulting from said second filtering process enter amplifier 13. The gain factor of said amplifier depends on the conditions offered by the phone line to which the apparatus of the invention is connected, as well as on the attenuation factors offered by different phone nets, said gain factor being regulated through variable resistor 13'. The output of said amplifier 13 is connected to the input of operational amplifier 14, the inputs of which are bridged by means of diode 14', said configuration providing a rectified output of the signals entering the same, thus eliminating one of the hemi-cycles of said signals. The hemi-cycles, e.g., the positive ones, are coupled to the input of gate 15, an inverter of the SCHMITT-TRIGGER-type, for the purpose of converting the analog signals into square waves, a prerequisite for their use in digital processing.

The decoding of the information, received in the form of audiofrequency signals and converted into square waves, is performed in the apparatus of the invention (in this case, in the apparatus shown in FIG. 1) by applying the method of the invention. Note that in said method and its variants the prevention of errors arising from the determination of square wave signals not being originated by phone pulses is a key feature. The above described circuit configuration reduces to a minimum the possibility of converting into square waves those other audiofrequency signals not originating from phone pulses.

The square wave signals present at the output of said gate 15 enter input "f" of microprocessor 20, which processes said square wave signals and converts them into binary-type information in the following manner:

(a) the first square wave signal (produced by the beginning of the first pulse of a phone pulse train) enters and is captured by microprocessor 20;

(b) upon capture of said first square wave signal, the microprocessor starts the count of a first time period of approximately 50 milliseconds and, the latter having elapsed, that of a second time period of approximately 30 milliseconds within which a second square wave signal produced by the ending of said phone pulse is captured;

(c) upon capturing said first and second square wave signals, the microprocessor accumulates the logic data corresponding to the decoding of said phone pulse;

(d) the microprocessor captures (should the beginning of an additional phone pulse take place) an additional square wave signal after the count of a third time period of approximately 30 milliseconds has elapsed (initiated as from the capture of said second square wave signal) and within the count of a fourth time period of approximately 50 milliseconds;

(e) the capture of the second additional square wave signal produced by the ending of said additional phone pulse is performed by the microprocessor as in step (b);

- (f) upon capturing said additional square wave signals originating from said additional phone pulse, the microprocessor accumulates the logic data corresponding to the decoding of said additional phone pulse;

(g) the microprocessor repeats the sequence indicated in steps (d)–(f), capturing possible additional square wave signals and accumulating the logic data corresponding to the decoding of possible additional phone pulses;

(h) the microprocessor determines the ending of said phone pulse train when it does not capture an additional square wave signal within the count of a fourth time period;

(i) the microprocessor, after determining the ending of said phone pulse train, converts said accumulated logic data into binary-type information corresponding to said decoded phone pulse train;

(j) the microprocessor then ignores the presence of square wave signals during the count of a time period of approximately 360 milliseconds, initiated as from the ending of the count of said fourth time period within which an additional square wave signal is not captured;

(k) the microprocessor is left in a position to register the beginning of another step (a).

Microprocessor 20 also determines the ending of a phone pulse train when it does not capture an additional square wave signal within the count of a second time period following the count of a fourth time period within which an additional square wave signal has been captured. Likewise, microprocessor 20 determines the absence of a first pulse of a phone pulse train when it does not capture a square wave signal within the count of a second time period of approximately 30 milliseconds initiated immediately after the count of a first time period of approximately 50 milliseconds initiated upon capturing of a square wave signal.

One of the variants of the way in which the microprocessor processes said square wave signals consists of the following modification of the above mentioned time periods: a first time period of approximately 51 milliseconds; a second time period of approximately 48 milliseconds; a third time period of approximately 27 milliseconds; a fourth time period of approximately 99 milliseconds; and, as from the determination of the ending of a phone pulse train, a time period of approximately 309 milliseconds.

Another variant of said time periods consists of the following modification: a first time period of approximately 46 milliseconds, a second time period of approximately 30 milliseconds; a third time period of approximately 27 milliseconds; a fourth time period of approximately 50 milliseconds; and, as from the determination of the ending of a phone pulse train, a time period of approximately 360 milliseconds.

Another variant consists of the following modification: a first time period of approximately 50 milliseconds; a second time period of approximately 30 milliseconds; a third time period of approximately 30 milliseconds; a fourth time period of approximately 50 milliseconds; and, as from the determination of the ending of a phone pulse train, a time period of approximately 330 milliseconds.

Another variant of the way in which the microprocessor processes said square wave signals consists of the following modification: upon capturing of the first square wave signal (produced by the beginning of the first pulse of a phone pulse train), microprocessor 20 initiates the count of a first time period of approximately 100 milliseconds within which a second square wave signal produced by the ending of said phone pulse is captured. Microprocessor 20 captures (should the beginning of an additional phone pulse take place) an additional square wave signal after the count of a second time period of approximately 27 milliseconds has elapsed (initiated as from the capturing of said second square wave signal) and within the count of a third time period of approximately 100 milliseconds. The capture of the second additional square wave signal produced by the ending of said additional phone pulse is performed by microprocessor 20 in the same way as described for the capture of said second square wave signal. Microprocessor 20 determines the ending of said phone pulse train when it does not register an additional square wave signal within the count of a third time period. After determination of the ending of a phone pulse train, microprocessor 20 ignores the presence of square wave signals during a time period of approximately 310 milliseconds.

Another variant lies in the fact that said filters 11 and 12 making up a cascade have a great selective capacity, thus allowing the audiofrequency signals produced through rotary dialing from the calling party's end to offer at the output of said cascade an amplitude considerably higher that that of other audiofrequency signals not being produced through rotary dialing. Said difference between amplitudes allows microprocessor 20 to decode the received information after conversion of the latter into square wave signals. Said decoding is performed as follows: as from the capturing of the square wave signal produced by the beginning of a first pulse of a phone pulse train, microprocessor 20 starts the count of a first time period of approximately 85 milliseconds after which microprocessor 20 captures (should the beginning of an additional phone pulse take place) an additional square wave signal within a second time period of approximately 70 milliseconds. Microprocessor 20 captures possible additional square wave signals produced by possible additional phone pulses in the same way as described for said additional phone pulse. Further, microprocessor 20 determines the ending of said phone pulse train when it does not register an additional square wave signal within the count of a second time period. After determination of the ending of a phone pulse train, microprocessor 20 ignores the presence of square wave signals during a time period of approximately 340 milliseconds.

Having described the way in which the microprocessor analyzes said square wave signals and converts them into binary-type information, we will see now the way in which the latter is used:

Microprocessor 20 offers the binary-type information (step i of the above described method) at its outputs "a", "b", "c" and "d", during a time period of, e.g., 600 milliseconds. Said binary-type information controls the encoder or audiofrequency generator 21. This encoder can be of the type intended for generating pure tones, sequential tones or multifrequencies, such as DTMF or Touch-Tone, etc. In the present case, said encoder 21 belongs to the type used for generating DTMF or Touch-Tone multifrequencies.

The multifrequencies generated by encoder 21 are amplified by amplifier 22 (the gain factor of which can be adjusted by means of variable resistor 22') and injected into the called phone line through transformer 23, the latter being capacitively related with said phone line by means of capacitors 23' and 23". Multifrequencies thus injected into said called phone line perform two functions:

(1) they alert the calling party that the sent phone pulse train has been decoded and that another phone pulse train can be sent;

(2) they activate decoding modules, not being the object of this invention, which are capacitively coupled to said called phone line. Said decoding modules have utilization circuits of their own intended for remote control functions and their use together with the method and apparatus of this invention allows parties calling from rotary phones to identify themselves or to identify the addressee of the call, to branch the phone call to certain phone sets and to operate various types of equipment, such as computers, Dictaphones, printers, facsimile machines, intercommunicators, dedicated phone line equipment, microphones, speakers, conventional phone answering machines, recorders, message players, alarm systems, locks, lights, air conditioners, furnaces, sprinklers; and any type of equipment or system capable of being coupled to a phone line as well as those to be remotely turned on/off. It must be noted that it is also possible by means of said multifrequencies to control from any rotary phone any equipment existing in the market, such as voice mail or voice messaging, or to be designed in the future, capable of being controlled by means of D.T.M.F. (e.g., Touch-Tone) multifrequencies.

The apparatus of this invention also releases said phone line, i.e., opens the d.c. current circuit of same, as follows:

Microprocessor 20, after commanding the closure of the d.c. current circuit, starts the count of a certain time period of, e.g., 1 minute. Should said time period come to its end without a decoding taking place due to the absence of audiofrequency information originating from rotary dialing, said microprocessor 20 shall de-activate through its output "g" relay 8. The latter, through its contact 8', produces the opening of the d.c. current circuit of the phone line, the apparatus of the invention being left in a position to receive a subsequent phone call.

Should the decoding take place before the ending of said predetermined time period, the microprocessor orders the opening of the d.c. current circuit of said phone line upon the ending of said predetermined time period, unless there is a coupling of another equipment loading said phone line.

The opening of the d.c. current circuit of said phone line also takes place (in the above explained way) when the information decoded by the microprocessor coincides with the logic data making up a code previously stored in the memory associated with said microprocessor 20, said code being intended for performing the opening of the d.c. current circuit.

Some exchanges show a polarity reverse in the called phone line when the calling party abandons the communication. The apparatus of this invention is ready to detect said polarity reverse and to immediately produce the opening of the d.c. current circuit of said phone line. Said polarity reverse is detected by relay 25 as soon as said phone line voltage drops to zero volt as a result of said polarity reverse. Said detection results in the closure of contact 25' of relay 25 during a fraction of a second, said closure making a high logic state appear, which is applied through diode 25" to input "h" of microprocessor 20. The detection of said high logic level by microprocessor 20 produces the de-activation of relay 8 and, thus, the opening of the d.c. current circuit of said phone line, the apparatus of this invention being left in a position to receive a subsequent phone call.

In case multifrequency signals generated by encoder 21 (as from the decoding of the received audiofrequency information) and injected into said phone line, activate one of said decoding modules (which are not the object of this invention) and said module in turn produces through its utilization or function performing circuit the coupling of another equipment loading said phone line, the apparatus of this invention detects the presence of the additional load being produced by said other equipment on the phone line. Said additional load is detected by means of additional load detector 24.

Basically, detector 24 is a voltage comparing circuit which, upon detecting said additional load, produces through its output 24' a high state entering through diode 24'', input "i", of microprocessor 20. The latter, upon detecting said high state, de-activates relay 8, which, by means of its contact 8', withdraws load impedance 5' from the phone line, the apparatus of the invention being left capacitively coupled to said phone line and, thus, enabled to keep decoding audiofrequency information until the moment when said other equipment coupled on said phone line or said decoding module produces the opening of the d.c. current circuit of said phone line. Note that the additional load can also be produced when the receiver of a phone set is unhooked, which, upon being again onhooked, produces the opening of the d.c. current circuit of said phone line.

When said opening of the d.c. current circuit takes place, detector 27 detects the electric voltage corresponding to the open d.c. current circuit of the phone line. Detector 27 is a voltage comparing circuit which, upon said opening taking place, produces a high state at its output 27', which, applied through diode 27'' to input "h" of microprocessor 20, leaves the apparatus of this invention ready to receive a subsequent phone call.

The coupling of said other equipment on said phone line can also be detected by tone detector 26. Detector 26 is a circuit set for detecting the presence of an audiofrequency signal being generated by said decoding module when the latter produces through its utilization or function performing circuit the coupling of said other equipment in turn producing an additional load on said phone line. Tone detector 26, upon detecting the audiofrequency signal generated by said decoding module, produces a high state on its output 26' entering, through diode 26'', input "i" of microprocessor 20, announcing to the latter the presence of said other equipment, thus originating the same process as explained above for the case of an additional load detection by means of detector 24.

Microprocessor 20 ignores all the information present at detectors 24, 25, 26 and 27 until the moment when the closure of the d.c. current circuit on said phone line takes place due to the fact that the phone call pulse trains or signals coming from the exchange enter signal or phone call pulse train detector 4 and the latter in turn informs microprocessor 20.

Figure 2:
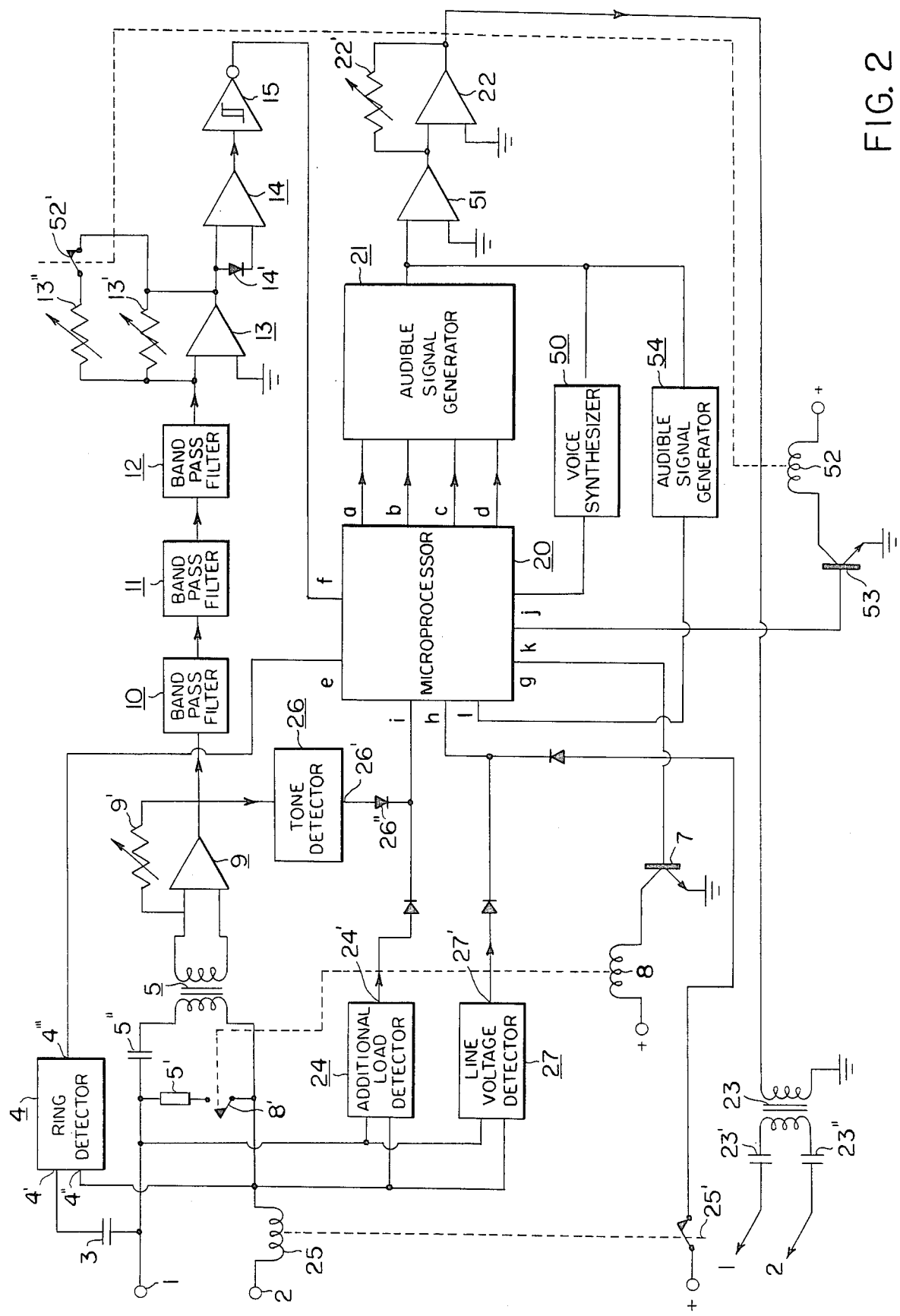
FIG. 2 shows a variant of FIG. 1 wherein audible signal generating means and a voice synthesizer have been included.

FIG. 2 is a variant of FIG. 1 configuration. The apparatuses respectively illustrated in FIGS. 1 and 2 are identical, except for the fact that the latter incorporates an audible signal generator 54, a voice synthesizer circuit represented by block 50, an operational amplifier 51 and a relay 52.

As explained above, the pulse produced by signal or phone call pulse train detector 4 (upon receiving phone call pulse trains or signals coming from the exchange) enters input "e" of microprocessor 20, the latter commanding through its output "g" relay 8, thus producing the closure of the d.c. current circuit on said called phone line.

Being said d.c. current circuit already closed, microprocessor 20 produces through its output L a high logic level the duration of which is, e.g., of 1 second. Said high logic level activates audible signal generator 54 which generates a certain audible signal entering operational amplifier 51, the latter featuring a follower mode configuration. Said audible signal generator 54 can also be of the type intended for reproducing messages stored as logic data and converted into analog signals.

The output of operational amplifier 51 is connected to the input of amplifier 22 which amplifies said audible signal and injects it into said phone line through transformer 23. Said audible signal is intended for alerting the calling party that he can start sending phone pulse trains through rotary dialing, the apparatus of this invention being left enabled to decode said phone pulse trains entering in the form of audiofrequency signals terminals 1 and 2 of the apparatus. Said received audiofrequency signals are converted into square wave signals in the same way as described for FIG. 1. The decoding of the information received in the form of audiofrequency signals already converted into square wave signals, and their conversion into other signals is performed by the apparatus of this invention (in this case, the one shown in FIG. 2) by applying the method already described for FIG. 1 with the following variants:

The square wave signals present at output of gate 15 enter input "f" of microprocessor 20 which processes said square wave signals in the same way as described for FIG. 1. FIG. 2 configuration shows a first variant wherein (as explained in the SUMMARY OF THE INVENTION with respect to the second, third, seventh, eighth, ninth and tenth variant of the method) there is a variation of the times during which the square wave signals are ignored. Basically, the duration of each square wave signal is measured in order to determine whether the beginning of a phone pulse train received in the form of audiofrequency signals processed as described for FIG. 1, takes place or not. Microprocessor 20 determines the absence of a phone pulse should a square wave signal present at input "f" of said microprocessor have a duration less than a time period of, e.g., 2 milliseconds, or a duration longer than a time period of, e.g., 4 milliseconds, or a duration less than a time period of, e.g., 4 milliseconds, or a duration longer than a time period of, e.g., 7 milliseconds.

A second variant of the apparatus is that wherein, after determination by microprocessor 20 of the ending of a phone pulse train, said microprocessor generates through its output "j" the logic data needed to command voice syntesizer 50. The latter converts said logic data into analog signals (phonemes) corresponding to the sonorous representation of the decoder character or number. Said analog signals (phonemes) generated by voice synthezizer 50 enter, through operational amplifier 51, amplifier 22 which, after amplifying said signals, injects them into said telephone line through transformer 23, thus allowing the calling party to verify whether the decoding performed by the apparatus of the invention corresponds to the information sent through rotary dialing from the calling phone set.

After commanding said voice synthesizer 50, microprocessor 20 controls the encoder or signal generator 21 through its outputs "a", "b", "c" and "d".

A third variant of the apparatus of the invention is that wherein microprocessor 20 accumulates the logic data corresponding to a certain number of decoded phone pulse trains, e.g., four phone pulse trains. Microprocessor 20, after decoding said four phone pulse trains, generates the logic data needed to command voice synthesizer 50 and, subsequently, the logic data needed to control encoder or signal generator 21 (as explained for the second variant), respecting the order of priority according to which said four phone pulse trains have been decoded.

In case that the number of phone pulse trains is less than, e.g., four pulse trains, microprocessor 20 proceeds to command voice syntheziser 50 and, subsequently, signal generator 21, generating the logic data corresponding to the accumulated phone pulse trains, provided an additional phone pulse train is not received during the count of a predetermined time period of, e.g., 5 seconds initiated as from the ending of each phone pulse train.

A fourth variant is that wherein the apparatus of this invention can be used even in those phone lines belonging to exchanges wherein, because of a design mistake, the sending of a phone pulse train through rotary dialing after closure of the d.c. current circuit is interpreted as an abandonment of the call.

Notwithstanding, such erroneous interpretation does not take place when character or number "1" is sent through rotary dialing. As explained below, character or number "1" can be sent as many times as needed.

In this fourth variant, any time the first decoded phone pulse train corresponds to a "1", microprocessor 20 starts the count of a predetermined time period of, e.g., 1000 milliseconds during which microprocessor 20 is left ready to decode any additional phone pulse train corresponding to character "1". Therefore, microprocessor 20 starts as many counts of said predetermined period as the decoded additional phone pulse trains corresponding to character "1". If, after completing one of said counts of said predetermined time period, an additional phone pulse train corresponding to character "1" is not decoded, microprocessor 20 adds the number of characters "1" which have been decoded and accumulated as logic data.

Microprocessor 20 proceeds to command voice synthesizer 50 and the signal encoder 21, generating the logic data corresponding to the result of the addition of the decoded characters "1". For example, if five phone pulse trains each corresponding to a "1" are decoded, microprocessor 20 generates the logic data corresponding to character "5". If, e.g., sixteen phone pulse trains each corresponding to character "1" are decoded, microprocessor 20 does not reinitiate the count of said predetermined time period but immediately generates the logic data corresponding to character "16". This example involving sixteen phone pulse trains corresponding to character "1" is given in view of the need of being able to generate from a rotary phone set the multifrequency characters (DTMF) corresponding to characters "*" and "#" and letters "A", "B", "C" and "D".

A fifth variant of the apparatus of the invention is that allowing the audiofrequency signals sent through rotary dialing from the calling end of a phone line to enter the apparatus of the invention even though they have been attenuated because of technical deficiencies of the phone line or exchanges involved in the established communication.

If this happens, the conversion of said audiofrequency signals into square wave signals turns out to be impossible. In such situation, after the count of a predetermined time period of, e.g., 5 seconds initiated immediately after activation of said audible signal generator 54, microprocessor 20 produces again the activation of the latter (as above explained) in order to alert the calling party that he can send again audiofrequency signals through rotary dialing. Further, microprocessor 20 produces a high logic level at its output "k" which, inverted by transistor 53, activates relay 52. The latter, through its normally closed contact 52', disconnects resistor 13" which was connected in parallel with variable resistor 13', increasing the gain factor of amplifier 13 to a certain level. The resulting enhanced amplification of said audiofrequency signals allows their conversion into square wave signals. Microprocessor 20 produces the de-activation of said relay 52 as soon as the apparatus of the invention is left in a position to receive a subsequent phone call.

Lastly, a sixth variant of the apparatus of the invention contemplates the possibility of the coupling of another equipment loading said called phone line. As explained for FIG. 1, when an additional load is applied on said phone line, the apparatus of the invention remains capacitively coupled to said phone line, thus able to continue decoding the audiofrequency signals sent through rotary dialing from the calling end and converting them into other signals. In this sixth variant, the performance of the apparatus is identical to that described for FIG. 1, but subject to the following condition: in order to allow the conversion of the received audiofrequency signals into other signals, it is necessary to send first through rotary dialing from the calling end the audiofrequency signals corresponding, e.g., to character "2". In other words, said character "2" is intended as a key for making the apparatus of this invention perform the conversion into other signals of the audiofrequency signals to be subsequently received. Microprocessor 20, upon capturing the decoding of a "2", activates audible signal generator 54 in order to alert the calling part that, as from that moment, he is enabled to send through rotary dialing audiofrequency signals to be decoded and converted into other signals.

Any time the count of a predetermined time period of, e.g., 2 seconds is over, initiated as from the last conversion of said audiofrequency signals into other signals, and provided no other of such signals has been converted within said time period, the calling party shall have to dial again number "2" (in this example) to keep converting into other signals the subsequent audiofrequency signals produced through rotary dialing.

Finally, note that the apparatus illustrated in FIG. 2 is left ready to receive a subsequent call in the same way as described for FIG. 1. In some versions of the apparatus of the invention not contemplating the coupling of another equipment loading the called phone line, the key mentioned in the description of the sixth variant of FIG. 2 should be used as from the closure of the d.c. current or conversation circuit of the called phone line.

Figure 3:
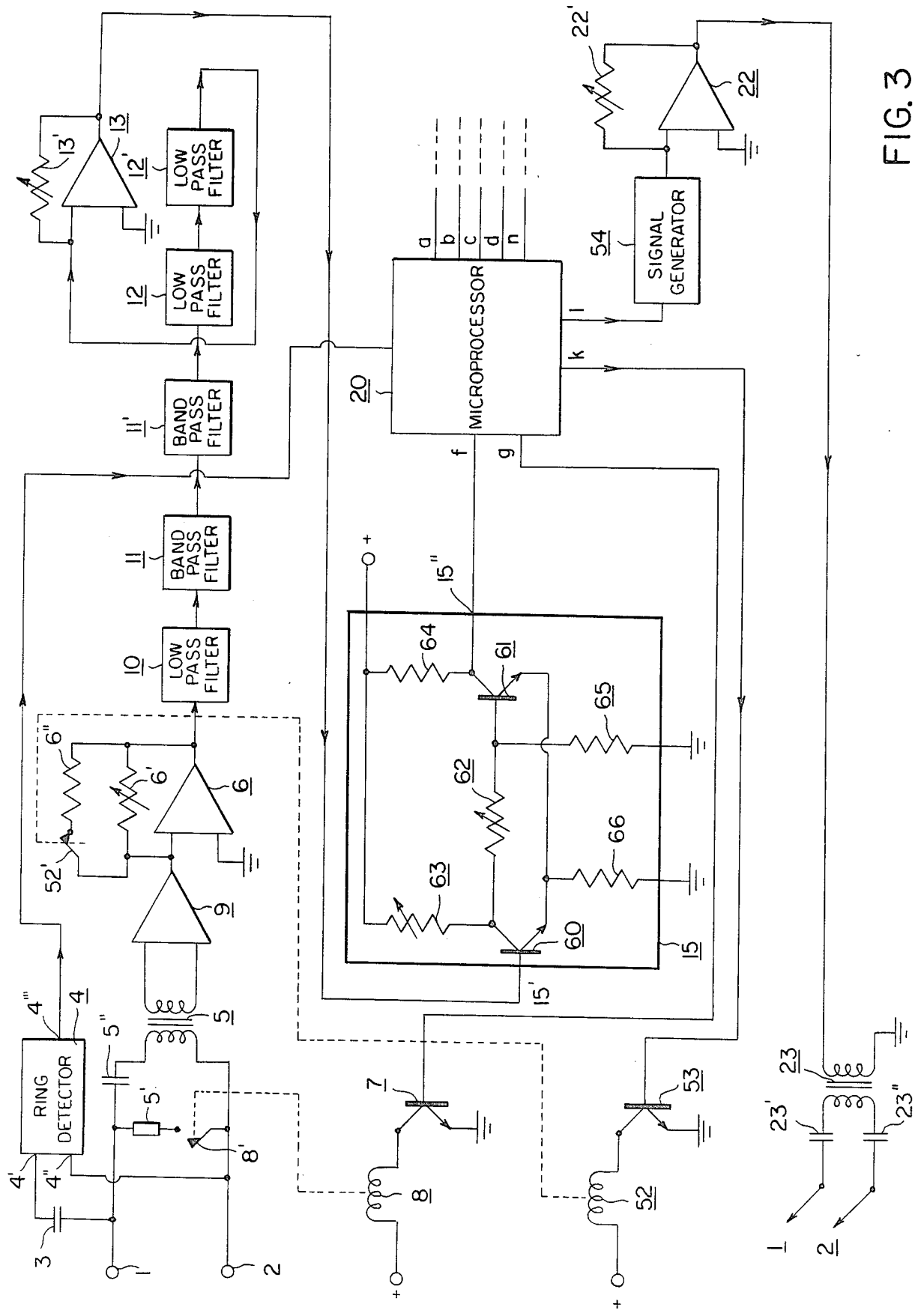
FIG. 3 shows another variant of the apparatus of the invention, intended for capturing the most significant audiofrequency signals produced through rotary dialing from a phone set.
Figure 1:
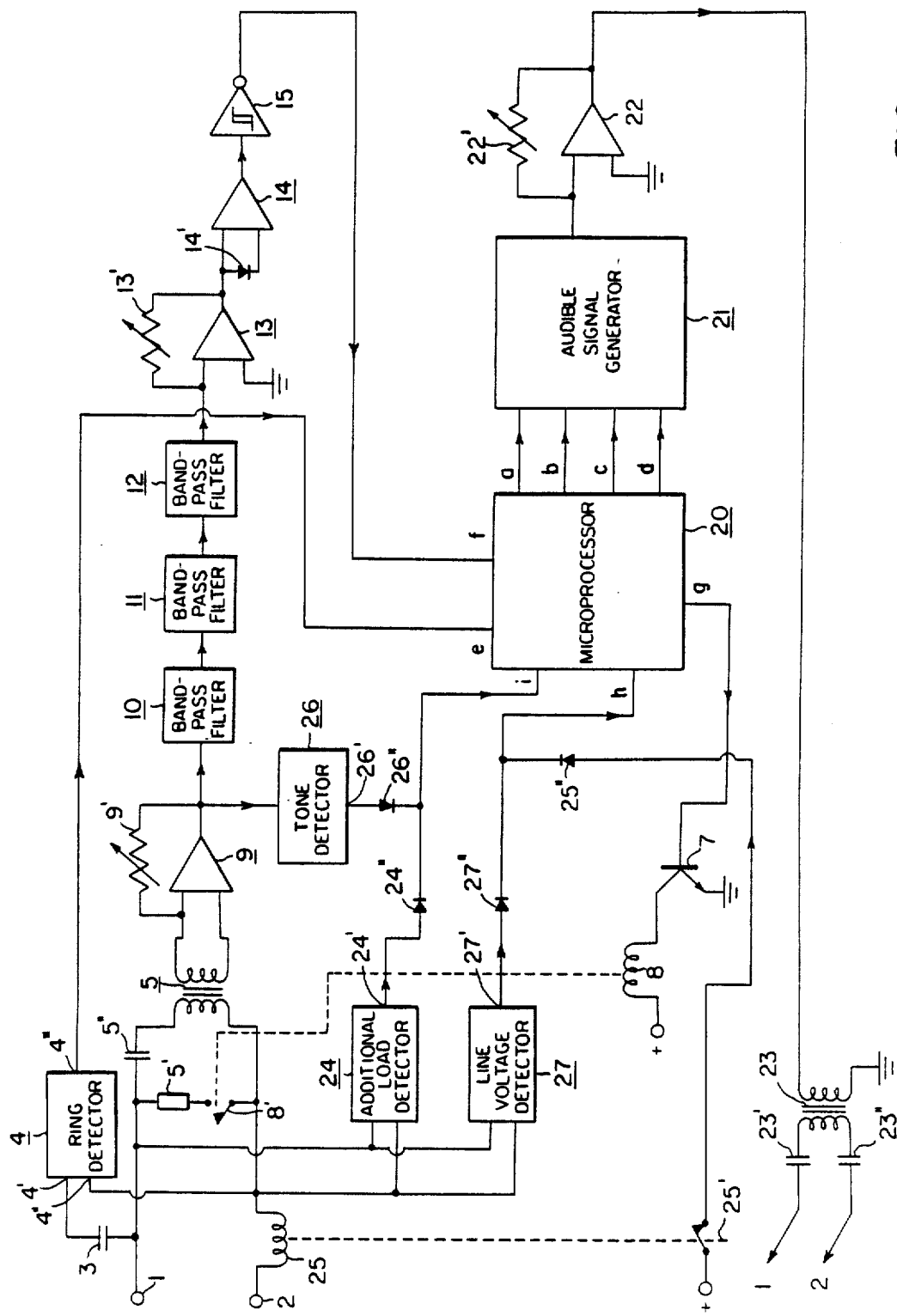
Figure 3:
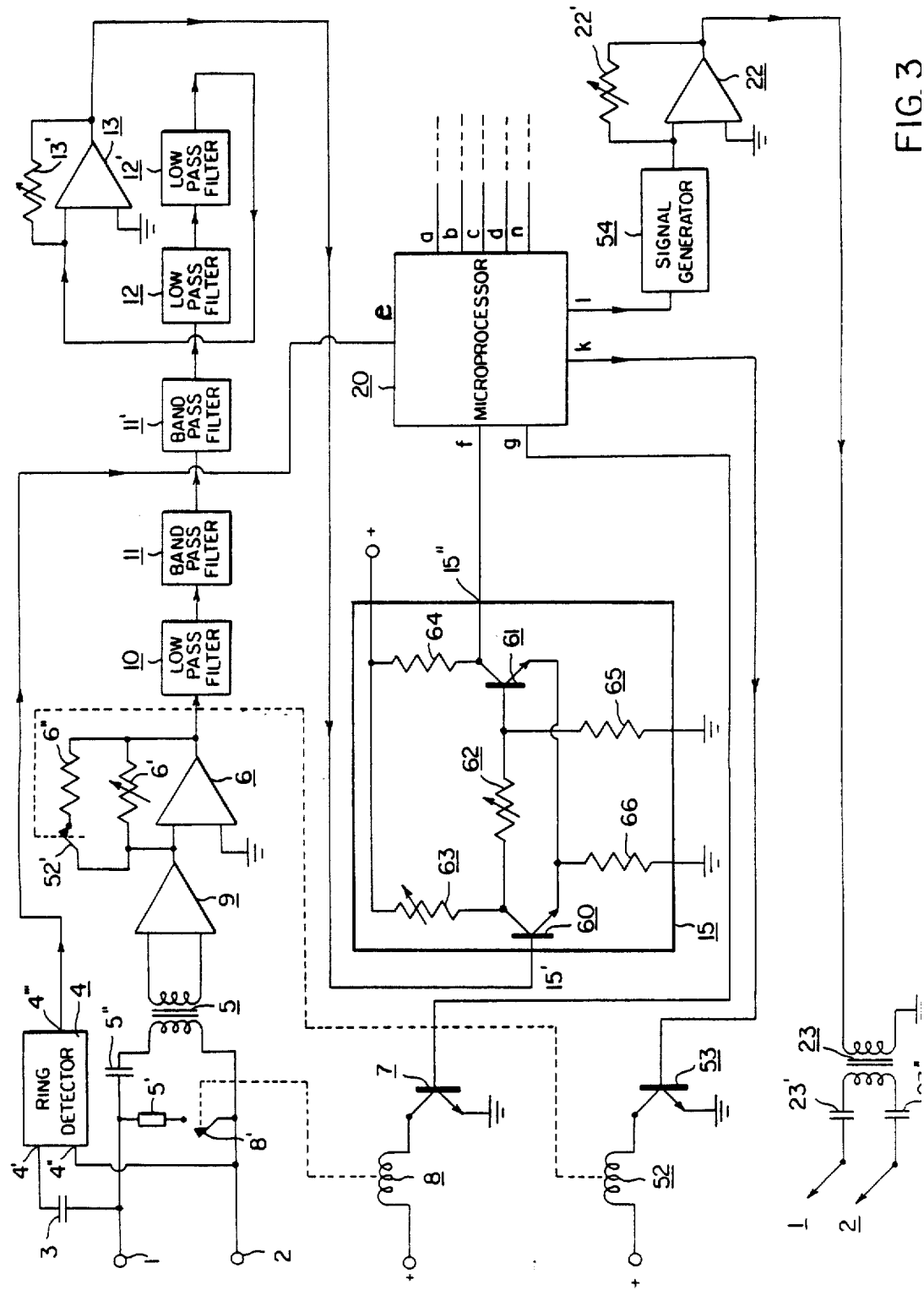

We'll describe now FIG. 3. It can be seen in FIG. 3 that the apparatus of the invention has a pair of terminals 1 and 2 capable of being connected to said phone line. The signals or phone call pulse trains coming from the exchange enter signal or phone call pulse train detector 4 through its inputs 4'—through capacitor 3—and 4". Said detector 4 produces a pulse at its output 4''' per each signal or phone call pulse train; such pulse enters input "e" of microprocessor 20 (in this context the word microprocessor means the electronic component proper plus its peripheral circuits and associated memories); said microprocessor 20 generates through its output "g" a high logic level which, inverted by transistor 7, produces the activation of relay 8. This latter, by means of its normally open contact 8', connects load impedance 5' to the phone line.

Said load impedance 5' produces a d.c. current circulation on said phone line, equal to or similar to the current circulation produced by a common phone set having its receiver unhooked, so that the connection of said impedance 5' to said phone line produces the closure of the d.c. current circuit of the same.

Upon closure of said d.c. current circuit, microprocessor 20 generates through its output "L" a high logic level, the duration of which is, e.g., of 1 second.

Said high logic level activates audible signal generator 54, the latter producing an audible signal that, after being amplified by amplifier 22 (the gain factor of which can be adjusted of means of variable resistor 22') is injected into said called phone line through transformer 23, the latter being capacitively coupled to said phone line by means of capacitors 23' and 23". Said audible signal is intended for alerting the calling party that he can start sending phone pulses through rotary dialing.

Said phone pulse trains sent through rotary dialing from the calling end enter the apparatus of this invention in the form of audiofrequency signals through input terminals 1 and 2.

The capture of the most significant portion of said audiofrequency signals produced through rotary dialing is performed as follows:

The audiofrequency signals produced through rotary dialing enter, through coupling transformer 5, operational amplifier 9, the latter having a differential mode configuration.

Said coupling transformer 5 is related with said phone line through capacitor 5". The output of said operational amplifier 9 is connected to the input of amplifier 6. The gain factor of the latter can be adjusted by means of variable resistor 6', to the end of maintaining at a predetermined level said audiofrequency signals. The gain factor of amplifier 6 can be adjusted by means of variable resistor 6' so that the level of said audiofrequency signals turns out to be the indicated one in order to allow their subsequent decoding by microprocessor 20 even though said audiofrequency signals enter the apparatus of the invention attenuated or else with a level higher than normal.

A circuit variant allows the automatic adjustment of amplifier 6 gain factor (as explained below), in accordance with the level with which said audiofrequency signals enter the apparatus.

The output of said amplifier 6 is connected to the input of filter 10 which is a lowpass-type filter. The latter is intended for attenuating the most significant components of said audiofrequency signals in the high frequency spectrum.

The signals resulting from this filtering process enter a cascade made up by two bandpass-type filters 11 and 11', intended for recovering the most useful componets of said signals, thus attenuating the less useful ones, as well as the noise components accompanying the phone pulses in their run through the phone lines. Filtered signals enter a second cascade made up by two lowpass-type filters 12 and 12', intended for attenuating the useless components of said signals which could remain after the above described filtering process, thus allowing the most useful components of said signals to be amplified by amplifier 13.

The gain factor of the latter can be adjusted by means of variable resistor 13'.

Amplified signals are coupled to input 15' of the SCHMITT-TRIGGER circuit illustrated in block 15, to the end of converting the analog character of the signals into square waves, this conversion being indispensable for their use in digital processing.

Said SCHMITT-TRIGGER circuit is made up by transistors 60 and 61, variable resistors 62 and 63 and resistors 64, 65 and 66. Variable resistors 62 and 63 allow to adjust the triggering voltage and the reset voltage of said SCHMITT-TRIGGER circuit.

The output 15" of said SCHMITT-TRIGGER circuit is connected to input "f" of microprocessor 20, thus allowing the decoding of the square wave signals generated by SCHMITT-TRIGGER 15 (representing the pulse train sent through rotary the calling party that he must send again audiofrequency signals though rotary dialing. Besides, microprocessor 20 produces a high logic level at its output "k" that, inverted by transistor 53, produces the activation of relay 52.

This latter, by means of it normally closed contact 52', disconnects resistor 13" which was connected in parallel with variable resistor 13', thus incressing the gain factor of amplifier 13.

The enhanced amplification of said audiofrequency signals allows their subsequent conversion into square wave signals.

The above described filtering process, together with the possibility of automatically varying the gain factor of dialing) by said microprocessor. This latter offers at its outputs "a", "b", "c", "d", . . . "n", the logic data corresponding to the decoded phone pulse train. Said logic data are used for commanding utilization circuits.

In case that the audiofrequency signals sent through rotary dialing from the calling end enter the apparatus of the invention attenuated because of technical deficiencies of the phone line or exchanges involved in the phone communication, thus being impossible the conversion of said audiofrequency signals into square wave signals, the microprocessor 20, after the count of a predetermined time period of, e.g., 5 seconds, initiated immediately after the activation of said audible signal generator 54, produces again the activation of said generator 54 in order to alert amplifier 13, prevents in all cases the vocal frequencies (not originated by rotary dialing) from producing the activation of SCHMITT-TRIGGER 15. Thus, microprocessor 20 is prevented from receiving spurious information affecting the decoding the audiofrequency signals originated in rotary dialing.

The preferred configurations of the apparatus for putting into practice the proposed method have been fully described and experts in the art will easily understand that variations or component substitutions can be effected, which, notwithstanding, are included within the spirit and scope of the present invention as defined in the annexed claims.

What is claimed is:

1. Method for converting into other signals the audiofrequency signals produced through rotary dialing from a calling phone set in accordance with its impulsion rate, and sent by the calling party to the called party's phone line, wherein said method comprises the steps of:
   (a) sending from the calling party's end the series of characters corresponding to the called party's phone line;
   (b) detecting on said called party's phone line the phone call pulse trains generated by the exchange;
   (c) closing the d.c. current or conversation circuit on said called party's phone line;
   (d) waiting for reception, on said called party's phone line, of audiofrequency signal sent through rotary dialing from said phone set by the calling party;
   (e) converting into square wave signals said audiofrequency signals received on said called party's phone line;

(f) determining the presence of the first square wave signal produced by the beginning of a first pulse of a phone pulse train;

(g) ignoring the presence of square wave signals during a certain first time period initiated as from the ending of the presence of said first square wave signal;

(h) determining the presence of the second square wave signal produced by the ending of said phone pulse within a certain second time period initiated immediately after said first time period has elapsed;

(i) accumulating the logic data corresponding to the determination of said first and second square wave signals produced by said phone pulse;

(j) ignoring the presence of square wave signals during a certain third time period initiated as from the ending of the presence of said second square wave signal;

(k) determining, should the beginning of an additional phone pulse take place, the presence of a first additional square wave signal within a certain fourth time period initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a certain other time period initiated immediately after said fourth time period, within which the presence of an additional square wave signal is not determined, has elapsed;

(u) recycling back to step (d);

(v) opening said d.c. current or conversation circuit on said called party's phone line after a certain time period has elapsed initiated after performance of step (c), or when the calling party abandons said conversation circuit;

(w) recycling back to step (a).

2. Method for converting into other signals the audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 30 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said information into other signals;

(s) injecting said other signals into said phone line;

(t) ignoring the presence of square wave signals during a time period of approximately 360 milliseconds initiated immediately after said fourth time period within which the presence of an additional square wave signal is not determined has elapsed;

(u) recycling back to step (d);

(v) opening said d.c. current or conversation circuit on said called party's phone line after a certain time period has elapsed, initiated after performance of step (c) or when the calling party abandons said conversation circuit;

(w) recycling back to step (a).

3. Method for converting into other signals audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;
(b) detecting on said called party's phone line the phone call pulse trains generated by the exchange;
(c) closing the d.c. current or conversation circuit on said called party's phone line;
(d) waiting for reception, on said called party's phone line, of audiofrequency signals sent through rotary dialing from said phone set by the calling party;
(e) converting into square wave signals said audiofrequency signals received on said called party's phone line;
(f) determining the presence of the first square wave signal produced by the beginning of a first pulse of a phone pulse train;
(g) ignoring the presence of square wave signals during a first time period of approximately 46 milliseconds initiated as from the ending of the presence of said first square wave signal;
(h) determining the presence of the second square wave signal produced by the ending of said phone pulse within a second time period of approximately 30 milliseconds initiated immediately after said first time period has elapsed;
(i) accumulating the logic data corresponding to the determination of said first and second square wave signals produced by said phone pulse;
(j) ignoring the presence of square wave signals during a third time period of approximately 27 milliseconds initiated as from the determination of the presence of said second square wave signal;
(k) determining, should the beginning of an additional phone pulse take place, the presence of a first additional square wave signal within a fourth time period of approximately 50 milliseconds initiated immediately after said third time period has elapsed;
(l) determinng the presence of the second additional square wave signal produced by the ending of said additional phone pulse, as in steps (g) and (h);
(m) accumulating the logic data corresponding to the determination of said first and second additional square wave signal produced by said additional phone pulse;
(n) determining the presence of possible additional square wave signals produced by possible additional phone pulses, as in steps (j), (k) and (l);
(o) accumulating the logic data corresponding to the determination of said possible additional square wave signals produced by said possible additional phone pulses;
(p) determining the ending of said phone pulse train when the presence of an additional square wave signal is not determined within a fourth time period;
(q) converting said accumulated logic data into information identifying said phone pulse train;
(r) converting said information into other signals;
(s) injecting said other signals into said phone line;
(t) ignoring the presence of square wave signals during a time period of approximately 360 milliseconds initiated immediately after said fourth time period within which the presence of an additional square wave signal is not determined has elapsed;
(u) recycling back to step (d);

(v) opening said d.c. current or conversation circuit on said called party's phone line after a certain time period has elapsed initiated after performance of step (c) or when the calling party abandons said conversation circuit;
(w) recycling back to step (a).

4. Method for converting into other signals the audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;
(b) detecting on said called party's phone line the phone call pulse trains generated by the exchange;
(c) closing the d.c. current or conversation circuit on said called party's phone line;
(d) waiting for reception, on said called party's phone line, of audiofrequency signals sent through rotary dialing from said phone set by the calling party;
(e) converting into square wave signals said audiofrequency signals received on said called part's phone line;
(f) determining the presence of the first square wave signal produced by the beginning of a first pulse of a phone pulse train;
(g) ignoring the presence of square wave signals during a first time period of approximately 51 milliseconds initiated as from the determination of the presence of said first square wave signal;
(h) determining the presence of the second square wave signal produced by the ending of said phone pulse within a second time period of approximately 48 milliseconds initiated immediately after said first time period has elapsed;
(i) accumulating the logic data corresponding to the determination of said first and second square wave signals produced by said phone.pulse;
(j) ignoring the presence of square wave signals during a third time period of approximately 27 milliseconds initiated as from the determination of the presence of said second square wave signal;
(k) determining, should the beginning of an additional phone pulse take place, the presence of a first additional square wave signal within a fourth time period of approximately 99 milliseconds initiated immediately after said third time period has elapsed;
(l) determining the presence of the second additional square wave signal produced by the ending of said additional phone pulse, as in steps (g) and (h);
(m) accumulating the logic data corresponding to the determination of said first and second additional square wave signals produced by said additional phone pulse;
(n) determining the presence of possible additional square wave signals produced by possible additional phone pulses, as in steps (j), (k) and (l);
(o) accumulating the logic data corresponding to the determination of said possible additional square wave signals produced by said possible additional phone pulses;
(p) determining the ending of said phone pulse train when the presence of an additional square wave signal is not determined within a fourth time period;
(q) converting said accumulated logic data into information identifying said phone pulse train;

(r) converting said information into other signals;

(s) injecting said other signals into said phone line;

(t) ignoring the presence of square wave signals during a time period of approximately 309 milliseconds initiated immediately after said fourth time period within which the presence of an additional square wave signal is not determined has elapsed;

(u) recycling back to step (d);

(v) continuing to receive said audiofrequency signals on said called party's phone line, converting them into said other signals, even though the coupling of other equipment on said phone line has taken place;

(w) recycling back to step (a) when said d.c. current circuit is opened on said called party's phone line.

5. Method for converting into other signals the audiofrequency signals produced through rotary dialing from a calling phone set in accordance with its impulsion rate, and sent by the calling party to the called party's phone line, wherein said method comprises the steps of:

(a) sending from the calling part's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 30 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of a second additional square wave signal is not determined within a second time period following a fourth time period during which the presence of an additional square wave signal has been determined;

(q) converting said logic data accumulated up to step (o) into information identifying said phone pulse train;

(r) converting said information into other signals;

(s) injecting said other signals into said phone line;

(t) ignoring the presence of square wave signals during a time period of approximately 330 milliseconds initiated immediately after said second time period within which the presence of a second additional square wave signal is not determined has elapsed;

(u) recycling back to step (d);

(v) opening said d.c. current or conversation circuit on said called party's phone line after a certain time period has elapsed, initiated after performance of step (c) or when the calling party abandons said conversation circuit;

(w) recycling back to step (a).

6. Method for converting into other signals the audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of the phone pulse produced through rotary dialing of character "1" from said phone set;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse produced through rotary dialing of character "1" from said phone set;

(j) ignoring the presence of square wave signals during a third time period of approximately 30 milliseconds initiated as from the determination of the presence of said second square wave signal;

(k) determining the ending of the phone pulse train corresponding to said character "1" when the presence of a square wave signal is not determined within a fourth time period of approximately 50 milliseconds, initiated immediately after said third time period has elapsed;

(l) ignoring the presence of square wave signals during a time period of approximately 360 milliseconds initiated immediately after said fourth time period within which the presence of a square wave signal is not determined has elapsed;

(m) recycling back to step (d);

(n) determining the presence and accumulating the corresponding logic data of possible additional square wave signals produced by possible additional phone pulses produced through rotary dialing of more characters "1", as in steps (f) to (m);

(o) determining the absence of reception of audiofrequency signals produced through rotary dialing of more characters "1" when the presence of another first square wave signal signal and of another second square wave signal is not determined within a time period of approximately 1,000 milliseconds initiated as from recycling back to step (d);

(p) converting said accumulated logic data into information resulting from the addition of characters "1" received as audiofrequency signals produced through rotary dialing;

(q) converting said information into other signals identifying the character resulting from said addition;

(r) injecting said other signals into said phone line;

(s) recycling back to step (d);

(t) opening said d.c. current or conversation circuit on said called party's phone line after a certain time period has elapsed initiated after performance of step (c) or when the calling party abandons said conversation circuit;

(u) recycling back to step (a).

7. Method for converting into other signals the audiofrequency signals produced through rotary dialing from a rotary phone set in accordance with its impulsion rate, and sent by the calling party to the called party's phone line, wherein said method comprises the steps of:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;

(d) waiting for reception, on said called party's phone line, of audiofrequency signals sent through rotary dialing from said phone set by the calling party;

(e) converting into square wave signals said audiofrequency signals received on said called party's phone line;

(f) determining the presence of the first square wave signal produced by the beginning of a first pulse of a phone pulse train;

(g) ignoring the presence of square wave signals during a first time period of approximately 50 milliseconds initiated as from the determination of the presence of said first square wave signal;

(h) determining the presence of the second square wave signal produced by the ending of said phone pulse within a second time period of approximately 30 milliseconds initiated immediately after said first time period has elapsed;

(i) accumulating the logic data corresponding to the determination of said first and second square wave signals produced by said phone pulse;

(j) ignoring the presence of square wave signals during a third time period of approximately 27 milliseconds initiated as from the determination of the presence of said second square wave signal;

(k) determining, should the beginning of an additional phone pulse take place, the presence of a first additional square wave signal within a fourth time period of approximately 50 milliseconds initiated immediately after said third time period has elapsed;

(l) determining the presence of the second additional square wave signal produced by the ending of said additional phone pulse, as in steps (g) and (h);

(m) accumulating the logic data corresponding to the determination of said first and second additional square wave signals produced by said additional phone pulse;

(n) determining the presence of possible additional square wave signals produced by possible additional phone pulses, as in steps (j), (k) and (l);

(o) accumulating the logic data corresponding to the determination of said possible additional square wave signals produced by said possible additional phone pulses;

(p) determining the ending of said phone pulse train when the presence of an additional square wave signal is not determined within a fourth time period;

(q) converting said accumulated logic data into information identifying said phone pulse train;

(r) converting said infomation into other signals;

(s) injecting said other signals into said phone line;

(t) ignoring the presence of square wave signals during a time period of approximately 360 milliseconds initiated immediately after said fourth time period within which the presence of an additional square wave signal is not determined has elapsed;

(u) recycling back to step (d);

(v) continuing to receive audiofrequency signals on said called party's phone line, converting them into square wave signals when the coupling of another equipment on said phone line takes place;

(w) stopping the conversion into other signals of said square wave signals produced by the audiofrequency signals produced through rotary dialing from said phone set;

(x) determining the presence of square wave signals produced by the audiofrequency signals produced through rotary dialing from said phone set of a certain single character;

(y) initiating again the conversion into other signals of said square wave signals produced by the audiofrequency signals produced through rotary dialing of any character from said phone set;

(z) recycling back to step (a) when said d.c. current circuit is opened on said called party's phone line.

8. Method for converting into other signals the audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;

(b) detecting on said called party's phone line the phone call pulse trains generated by the exchange;

(c) closing the d.c. current or conversation circuit on said called party's phone line;
(d) waiting for reception, on said called party's phone line, of audiofrequency signals sent through rotary dialing from said phone set by the calling party;
(e) converting into square wave signals said audiofrequency signals received on said called party's phone line;
(f) determining the presence of the first square wave signal produced by the beginning of a first pulse of a phone pulse train;
(g) determining the presence of the second square wave signal produced by the ending of said phone pulse within a first time period of approximately 100 milliseconds initiated as from the determination of the presence of said first square wave signal;
(h) accumulating the logic data corresponding to the determination of said first and second square wave signals produced by said phone pulse;
(i) ignoring the presence of square wave signals during a second time period of approximately 27 milliseconds initiated as from the determination of the presence of said second square wave signal;
(j) determining, should the beginning of an additional phone pulse take place, the presence of a first additional square wave signal within a third time period of approximately 100 milliseconds initiated immediately after said second time period has elapsed;
(k) determining the presence of the second additional square wave signal produced by the ending of said additional phone pulse, as in step (g);
(l) accumulating the logic data corresponding to the determination of said first and second additional square wave signals produced by said possible additional phone pulse;
(m) determining the presence of possible additional square wave signals produced by possible additional phone pulses, as in steps (i), (j) and (k);
(n) accumulating the logic data corresponding to the determination of said possible additional square wave signals produced by said possible additional phone pulses;
(o) determining the ending of said phone pulse train when the presence of an additional square wave signal is not determined within a third time period;
(p) converting said acumulated logic data into information identifying said phone pulse train;
(q) converting said information into other signals;
(r) injecting said other signals into said phone line;
(s) ignoring the presence of square wave signals during a time period of approximately 310 milliseconds initiated immediately after said third time period within which the presence of an additional square wave signal is not determined has elapsed;
(t) recycling back to step (d);
(u) opening the d.c. current or conversation circuit on said called party's phone line after a certain time period has elapsed, initiated after performance of step (c) or when the calling party abandons said conversation circuit;
(v) recycling back to step (a).

9. Method for converting into other signals the audiofrequency signals produced through rotary dialing from a calling phone set in accordance with its impulsion rate, and sent by the calling party to the called party's phone line, wherein said method comprises the steps of:

(a) sending from the calling party's end the series of characters corresponding to the called party's phone line;
(b) detecting on said called party's phone line the phone call pulse trains generated by the exchange;
(c) closing the d.c. current or conversation circuit on said called party's phone line;
(d) waiting for reception, on said called party's phone line, of audiofrequency signals sent through rotary dialing from said phone set by the calling party;
(e) converting into square wave signals said audiofrequency signals received on said called party's phone line;
(f) determining the pesence of the square wave signal produced by the beginning of a first pulse of a phone pulse train;
(g) ignoring the presence of square wave signals during a first time period of approximately 85 milliseconds initiated as from the determination of the presence of said square wave signal;
(h) accumulating the logic data corresponding to the determination of said square wave signal produced by said phone pulse;
(i) determining, should the beginning of an additional phone pulse take place, the presence of an additional square wave signal within a second time period of approximately 70 milliseconds initiated immediately after said first time period has elapsed;
(j) accumulating the logic data corresponding to the determination of said additional square wave signal produced by said additional phone pulse;
(k) determining the presence of possible additional square wave signals produced by possible additional phone pulses, as in steps (g) and (i);
(l) accumulating the logic data corresponding to the determination of said possible additional square wave signals produced by said possible additional phone pulses;
(m) determining the ending of said phone pulse train when the presence of an additional square wave signal is not determined within a second time period;
(n) converting said accumulated logic data into information identifying said phone pulse train;
(o) converting said information into other signals;
(p) injecting said other signals into said phone line;
(q) ignoring the presence of square wave signals during a time period of approximately 340 milliseconds initiated immediately after said second time period within which the presence of an additional square wave signal is not determined has elapsed;
(r) recycling back to step (d);
(s) opening said d.c. current or conversation circuit on said called party's phone line after a certain time period has elapsed, initiated after performance of step (c) or when the calling party abandons said conversation circuit;
(t) recycling back to step (a).

10. Apparatus for converting into other signals the audiofrequency signals sent through rotary dialing from a calling phone set to a called party's phone line, wherein said apparatus comprises a pair of terminals capable of being connected to the called phone line; the first terminal of said pair of terminals being connected through a first capacitor to one input of a phone call pulse train detector and, through a second capacitor, to one end of the primary winding of a first coupling transformer and to one end of a load impedance; the second terminal of said pair of terminals being connected to the other end of the primary winding of said first coupling transformer, to another input of said phone call pulse train detector and to a contact of a first relay; the other end of said load impedance being connected to another contact of said first relay; the secondary of said first coupling transformer being connected to the input of a first operational amplifier which has a differential mode configuration, said first operational amplifier having its output connected to a second amplifier which has gain adjusting means, the output of said second amplifier being connected to the input of a lowpass filter having its output connected to the input of a cascade made up by bandpass-type filters; the output of said bandpass-type filters cascade being connected to the input of another cascade made up by lowpass filters having its output connected to a third amplifier which has gain adjusting means, said third amplifier in turn having its output connected to the input of a SCHMITT-TRIGGER; the output of said phone call pulse train detector and the output of said SCHMITT-TRIGGER being respectively connected to a first and a second inputs of a microprocessor; a first and a second outputs of said microprocessor being respectively connected to the base of a first and a second transistors; said first transistor with its emitter ground connected and its collector, through the winding of said first relay, connected to a power supply; said second transistor with its emitter ground-connected and its collector, through the winding of a second relay, connected to said power supply; a third output of said microprocessor connected to the input of an audible signal generator having its output connected to the input of a fourth amplifier having gain adjusting means; the output of said fourth amplifier connected to the end of a first winding of a second coupling transformer, the other end of said first winding being ground-connected; the ends of a second winding of said second coupling transformer, through one capacitor each, connected to said pair of terminals; said second relay with a pair of contacts for connection-disconnection of the gain adjusting means of said second amplifier; finally, said microprocessor with a certain number of outputs capable of being connected to the same number of inputs of an encoder.

11. The apparatus for converting into other signals of claim 10, wherein said lowpass filter is a 100 Hz+ −20 Hz filter.

12. The apparatus for converting into other signals of claim 10, wherein said bandpass-type filter cascade is a 150 Hz+ −30 Hz filter cascade.

13. The apparatus for converting into other signals of claim 10, wherein said other lowpass-type filter cascade is a 200 Hz+ −30 Hz filter cascade.

14. The apparatus for converting into other signals of claim 10, wherein said SCHMITT-TRIGGER is adjustable and has a pair of variable resistors for adjustment of its triggering and reset voltages.

15. The apparatus for converting into other signals of claim 10, wherein the gain adjusting means of said second amplifier comprises an adjustable resistor having connected in parallel another resistor through said contacts of said second relay.

16. The apparatus for converting into other signals of claim 10, wherein gain adjusting means of the third and fourth amplifier are adjustable resistors.

* * * * *

UNITED STATES PATENT AND TRADEMARK OFFICE
CERTIFICATE OF CORRECTION

PATENT NO. : 4,771,450

DATED : September 13, 1988

INVENTOR(S) : Horacio Castro et al.

It is certified that error appears in the above-identified patent and that said Letters Patent is hereby corrected as shown below:

FIGURES 1 and 3, should appear as shown on the attached sheets.

Signed and Sealed this

Thirty-first Day of January, 1989

Attest:

DONALD J. QUIGG

Attesting Officer

Commissioner of Patents and Trademarks